(12) United States Patent
Wu et al.

(10) Patent No.: US 11,368,042 B2
(45) Date of Patent: Jun. 21, 2022

(54) ELECTRONIC SWITCH CONTROL CIRCUITS FOR SOLAR LIGHTING SYSTEMS AND METHODS FOR CONTROLLING THE SAME

(71) Applicant: Hao Wu, Guangdong (CN)

(72) Inventors: Hao Wu, Guangdong (CN); Weihua Li, Guangdong (CN)

(73) Assignee: Hao Wu, Shenzhen (CN)

( * ) Notice: Subject to any disclaimer, the term of this patent is extended or adjusted under 35 U.S.C. 154(b) by 402 days.

(21) Appl. No.: 16/536,312

(22) Filed: Aug. 9, 2019

(65) Prior Publication Data

US 2019/0364652 A1  Nov. 28, 2019

Related U.S. Application Data

(63) Continuation of application No. PCT/CN2017/090086, filed on Jun. 26, 2017.

(51) Int. Cl.
| | |
|---|---|
| *H02J 7/35* | (2006.01) |
| *H02J 7/00* | (2006.01) |
| *H02S 40/38* | (2014.01) |
| *H05B 45/50* | (2022.01) |
| *H05B 47/16* | (2020.01) |
| *H05B 45/00* | (2022.01) |

(52) U.S. Cl.
CPC .............. *H02J 7/35* (2013.01); *H02J 7/0013* (2013.01); *H02S 40/38* (2014.12); *H05B 45/00* (2020.01); *H05B 45/50* (2020.01); *H05B 47/16* (2020.01)

(58) Field of Classification Search
None
See application file for complete search history.

(56) References Cited

U.S. PATENT DOCUMENTS

2005/0082989 A1\* 4/2005 Jones ...................... F21L 4/027
315/194
2016/0219664 A1\* 7/2016 Ellenberger .......... H02J 7/0003

FOREIGN PATENT DOCUMENTS

CN      204717574 U     10/2015
WO    WO-2018222320 A1 \* 12/2018 ......... H01L 31/0504

OTHER PUBLICATIONS

International Search Report of PCT Patent Application No. PCT/CN2017/090086 dated Feb. 24, 2018.

\* cited by examiner

*Primary Examiner* — Anh Q Tran (57) ABSTRACT

An electronic switch control circuit for a solar lighting system and a method for controlling the same. Solar panels of the solar lighting system are respectively coupled to a charging circuit and a photoelectric signal identification circuit which is coupled to a logic control circuit and an enable circuit sequentially. The enable circuit is respectively coupled to a driving circuit and the charging circuit. The photoelectric signal identification circuit, the logic control circuit, the enable circuit and the charging circuit are respectively coupled to the common end of the driving circuit and rechargeable batteries. The electronic switch control circuit further includes a timing circuit and an oscillating circuit, wherein the oscillation circuit is coupled to the timing circuit, and the timing circuit is coupled to the logic circuit. The oscillation circuit and the timing circuit are coupled to the common end of the rechargeable batteries and the driving circuit.

2 Claims, 8 Drawing Sheets

ELECTRONIC SWITCH CONTROL CIRCUITS FOR SOLAR LIGHTING SYSTEMS AND METHODS FOR CONTROLLING THE SAME

CROSS REFERENCE TO RELATED APPLICATIONS

The present application is a Continuation Application of PCT Application No. PCT/CN2017/090086 filed on Jun. 26, 2017, the contents of which are incorporated herein by reference in their entirety.

FIELD OF THE INVENTION

The present invention relates to electrical technology, more particular, to an electronic switch control circuit for a solar lighting system and a method for controlling the same.

BACKGROUND OF THE INVENTION

At present, in order to solve electric leakage problem occurring in circuit boards of solar LED lighting products with rechargeable batteries during transportation (by sea) and storage (sometimes up to one year), a mechanical switch (an insulation sheet) is provided to isolate the batteries from discharge circuits, thereby maintaining battery power of the products and avoiding excessive leakage during long-term storage and transportation. As such, the products will maintain sufficient battery power for customers to do inspection on the products when customers buy them.

Solar LED lighting products are typically used in outdoor environment. If a mechanical switch is used to isolate the batteries from the discharge circuits in the solar LED lighting products, completely sealing of the solar LED lighting products cannot be achieved and thus water-proof and moisture-proof of the solar LED lighting products with the mechanical switch cannot be achieved. Oxidation and short circuit and the like are primary causes leading to decreased service life of the solar LED lighting products. Additionally, use of the mechanical switch in the solar LED lighting products may undesirably influence appearance of the products and lead to additional cost for sealing. And, the sealing effect is unsatisfied.

SUMMARY OF THE INVENTION

In one aspect, an electronic switch control circuit for solar lighting systems are provided herein, which can be used to replace the mechanical switch without introducing any additional costs, to solve the leakage problem occurring in circuit boards of solar LED lighting products during storage or transportation and to avoid use of a conventional mechanical switch to control the circuit to turn on or off, thereby improving reliability of the entire solar lighting systems with cost saving. The electronic switch control circuit for solar lighting systems as provided herein can greatly improve the convenience for customers, that is to say, the customers could use the solar LED lighting products with electronic switch control circuit as provided herein without unpacking the products.

In one embodiment, provided herein is an electronic switch control circuit for a solar lighting system. The solar lighting system includes solar panels which are respectively coupled to a charging circuit and a photoelectric signal identification circuit that is coupled to a logic control circuit and an enable circuit sequentially. The enable circuit is respectively coupled to a driving circuit and the charging circuit. The photoelectric signal identification circuit, the logic control circuit, the enable circuit and the charging circuit are respectively coupled to the common end of the driving circuit and rechargeable batteries. The electronic switch control circuit further includes an oscillating circuit and a timing circuit, wherein the oscillating circuit is coupled to the timing circuit, and the timing circuit is coupled to the logic control circuit. The oscillating circuit and the timing circuit are coupled to the common end of the rechargeable batteries and the driving circuit. The oscillating circuit generates a clock signal. The timing circuit receives the clock signal and then performs timekeeping for controlling the preset time (N seconds). The photoelectric signal identification circuit is configured to detect the number (M) of lighting/shading actions on the solar panels.

In one embodiment as described herein, the logic control circuit includes an RS trigger and a D trigger. The timing circuit and the photoelectric signal identification circuit are respectively coupled to the RS trigger that is coupled to the D trigger. Q pin of the D trigger is coupled to the enable circuit, and $\overline{Q}$ pin of the D trigger is coupled to D pin of the D trigger. The RS trigger and the D trigger are coupled to the common end of the rechargeable batteries and the driving circuit. The oscillating circuit generates a clock signal. The timing circuit receives the clock signal and then performs timekeeping for controlling the preset time (N seconds). The photoelectric signal identification circuit is configured to detect the number (M) of the lighting/shading actions on the solar panels.

In one embodiment, provided herein is an electronic switch control circuit for a solar lighting system. The solar lighting system includes solar panels which are coupled to a charging circuit that is respectively coupled to a photoelectric signal identification circuit, an enable circuit and the common end of a driving circuit and rechargeable batteries. The photoelectric signal identification circuit is coupled to a logic control circuit and the enable circuit sequentially, and the enable circuit is coupled to the driving circuit. The photoelectric signal identification circuit, the logic control circuit and the enable circuit are coupled to the common end of the driving circuit and the rechargeable batteries.

In one embodiment as described herein, the electronic switch control circuit further includes a timing circuit and an oscillating circuit, wherein the oscillating circuit is coupled to the timing circuit, and the timing circuit is coupled to the logic control circuit. The oscillating circuit, the timing circuit and the enable circuit are coupled to the common end of the rechargeable batteries and the driving circuit. The oscillating circuit generates a clock signal. The timing circuit receives the clock signal and then performs timekeeping for controlling the preset time (N seconds). The photoelectric signal identification circuit is configured to detect the number (M) of lighting/shading actions on the solar panels.

In one embodiment as described herein, the logic control circuit includes an RS trigger and a D trigger. The timing circuit and the photoelectric signal identification circuit are respectively coupled to the RS trigger that is respectively coupled to the D trigger and the common end of the driving circuit and the rechargeable batteries. Q pin of the D trigger is coupled to the enable circuit, and $\overline{Q}$ pin of the D trigger is coupled to D pin of the D trigger. The D trigger is coupled to the common end of the rechargeable batteries and the driving circuit. The oscillating circuit generates a clock signal. The timing circuit receives the clock signal and then performs timekeeping for controlling the preset time (N seconds). The photoelectric signal identification circuit is configured to detect the number (M) of the lighting/shading actions on the solar panels.

In another aspect, provided herein is a method for controlling the electronic switch control circuit for the solar lighting system, comprising the following steps:

(1) initiating test for the solar lighting system after completing assembly of the system;

(2) performing a preset number of lighting/shading actions (M) on solar panels within a preset time (N seconds), and observing the state of the solar lighting system;

(3) determining, whether the state of the solar lighting system is consistent with an expected state corresponding to the lighting/shading actions and the solar lighting system is maintained in an off state after M numbers of lighting/shading actions on the solar panels, if yes, it can be determined that the solar lighting system has been locked by the electronic switch control circuit, if not, it can be determined that the solar lighting system is a defective system;

(4) maintaining the system under function-locking state with low power consumption after locking the system, and then packing the product having the solar lighting system as provided herein;

(5) unlocking the system through performing M numbers of lighting/shading actions on the solar panels within N seconds when using the product.

In still another aspect, provided herein is a method for controlling the electronic switch control circuit for the solar lighting system, the method comprises the following steps:

(1) initiating test for the solar lighting system after completing assembly of the system;

(2) performing a preset number of lighting/shading actions (M) on solar panels within a preset time (N seconds), and observing the state of the solar lighting system;

(3) determining, whether the state of the solar lighting system is consistent with an expected state corresponding to the lighting/shading actions and the solar lighting system is maintained in an off state after M numbers of lighting/shading actions on the solar panels, if yes, it can be determined that the solar lighting system has been locked by the electronic switch control circuit, if not, it can be determined that the solar lighting system is a defective system; or determining, whether the state of the solar lighting system is consistent with an expected state corresponding to the lighting/shading actions and LED is off after the lighting/shading actions for Y seconds, if yes, it can be determined that the solar lighting system has been locked by the electronic switch control circuit, and no light control response function is exhibited, so as to save time for packing the product comprising the solar lighting system as provided herein; if not, the solar lighting system may be considered as a defective system;

(4) unlocking the system through performing one lighting/shading action on the solar panels when using the product.

The present disclosure achieves the following advantages.

The electronic switch with the electronic switch control circuit as provided herein can replace the mechanical switch to solve leakage of solar LED lighting products during storage and transportation, such that the solar panels are completely isolated from the external environment during storage and transportation so as to achieve water-proof and moisture-proof features and ensure reliability and stability of the solar LED lighting products.

The solar LED lighting products including the electronic switch control circuit as provided herein can pass through waterproof test under 360-degree spraying (while the existing products can merely pass through waterproof test under vertical spraying), and processing volume and the cost for the solar LED lighting products are reduced.

The cost for manufacturing the electronic switch including the electronic switch control circuit as provided herein can be reduced (for example, there is no need to use mechanical switch, insulation sheet, and screws and the like, and labor cost for manufacturing the electronic switch is reduced) and the productivity is greatly enhanced. The said electronic switch is integrated into the control chips without any extra procedures and costs.

The solar LED lighting product as provided herein can be manufactured to a completely sealed product, and provide a guide for the new appearance and special application of the solar products (for example, underground solar lights).

DETAILED DESCRIPTION OF THE INVENTION

Several aspects of the invention are described below in details by reference to appended drawing and specific embodiments. The skilled in the art should understand that the embodiments are set forth to provide an illustration, rather than limit the scope of the present invention. The scope of the present invention is limited by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Figure 2:
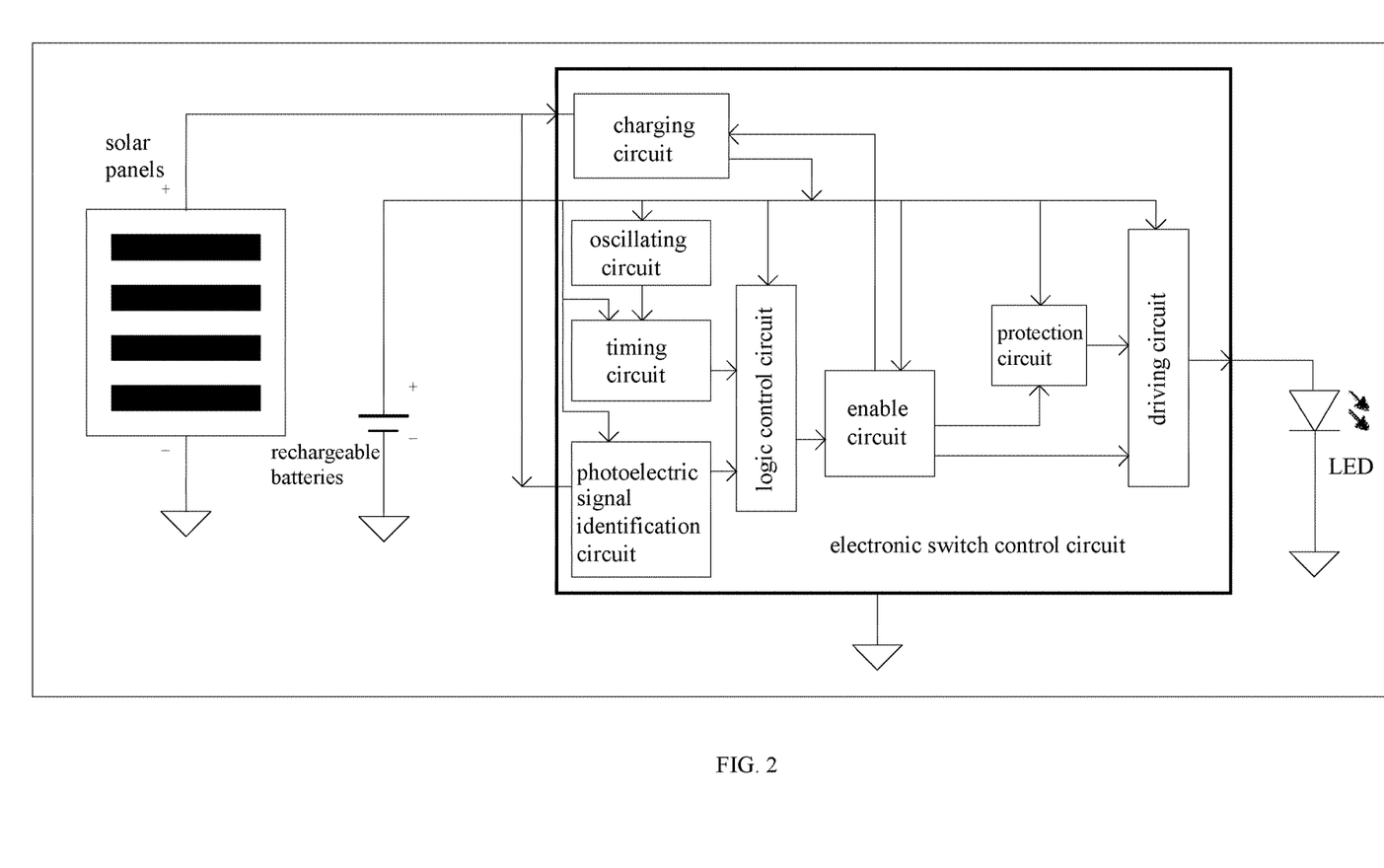
FIG. 2 is a circuit block diagram of the electronic switch control circuit for the solar lighting system according to the second embodiment as provided herein.
Figure 7:
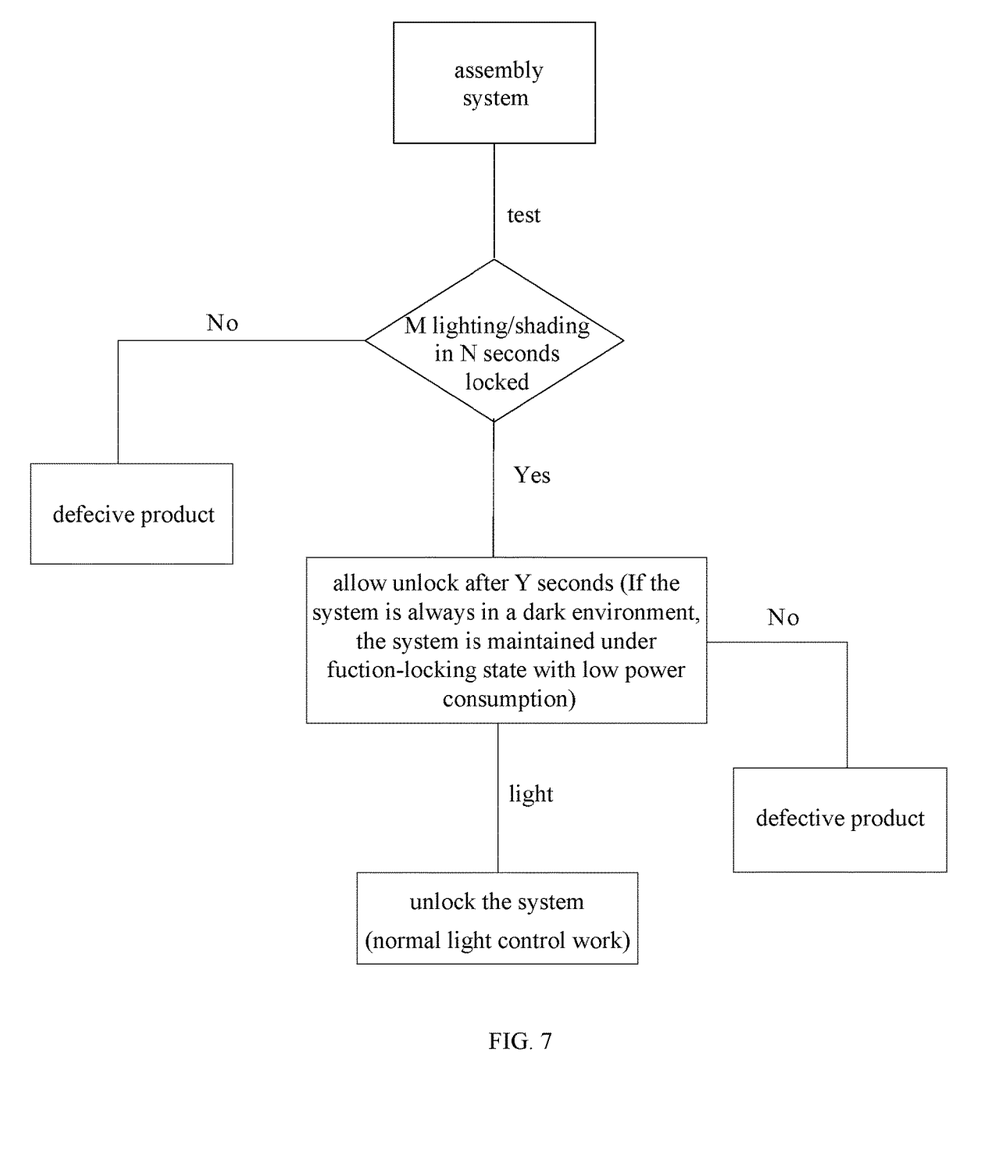
FIG. 7 is a flow chart of the method for controlling the electronic switch control circuit according to the first embodiment as described herein.

FIGS. 2 and 7 illustrate the first embodiment as provided herein.

As shown in FIG. 2, the solar panels of the solar lighting system are respectively coupled to a charging circuit and a photoelectric signal identification circuit that is coupled to a logic control circuit and an enable circuit sequentially. The enable circuit is respectively coupled to a driving circuit and the charging circuit that is coupled to the common end of the driving circuit and rechargeable batteries. The common end of the driving circuit and the rechargeable batteries is also coupled to an oscillating circuit, a timing circuit, the photoelectric signal identification circuit, the logic control circuit, the enable circuit and a protection circuit. The oscillating circuit is coupled to the timing circuit that is coupled to the logic control circuit. The enable circuit is coupled to the protection circuit which is coupled to the driving circuit. The driving circuit is coupled to a LED lamp. The oscillating circuit generates a clock signal. The timing circuit receives the clock signal and then performs timekeeping for controlling the preset time (N seconds). The photoelectric signal identification circuit is configured to detect the number (M) of the lighting/shading actions on the solar panels.

In the day time, the driving circuit for the LED receives a control signal from the photoelectric signal identification circuit to cutoff the current flowing to the LED, so that the LED does not emit light. When the voltage of the solar panels is higher than that of the rechargeable batteries, the solar panels charge the rechargeable batteries through the charging circuit. At night, the driving circuit receives a control signal from the photoelectric signal identification circuit to supply the current from the rechargeable batteries to the LED to allow the LED to emit light. At this time, since the voltage of the solar panels is lower than that of the rechargeable batteries, the rechargeable batteries will not be charged, and the charging circuit will prevent the current of the rechargeable batteries from flowing to the solar panels. The oscillating circuit generates a clock signal. The timing circuit receives the clock signal and then performs timekeeping for controlling the preset time (N seconds). The photoelectric signal identification circuit is configured to detect the number (M) of the lighting/shading actions on the solar panels.

As shown in FIG. 7, a method for controlling the electronic switch control circuit for the solar LED lighting system comprises the following steps:

(1) initiating test for the solar LED lighting system after completing assembly of the system;

(2) performing a preset number of lighting/shading actions (M) on solar panels within a preset time (N seconds), and observing the state of the LED in the solar LED lighting system;

(3) determining, whether the state of the LED is consistent with an expected state corresponding to the lighting/shading actions and the LED is off after the lighting/shading actions for Y seconds, if yes, it can be determined that the solar LED lighting system has been locked by the electronic switch control circuit, and no light control response function is exhibited, so as to save time for packing the product comprising the solar LED lighting system as provided herein; if not (for example the LED is not off after the lighting/shading actions), the solar LED lighting system may be considered as a defective system;

(4) maintaining the system under function-locking state with low power consumption after locking the system, and then packing the product having the solar LED lighting system as provided herein;

(5) unlocking the system through performing one lighting/shading action on the solar panels.

Figure 3:
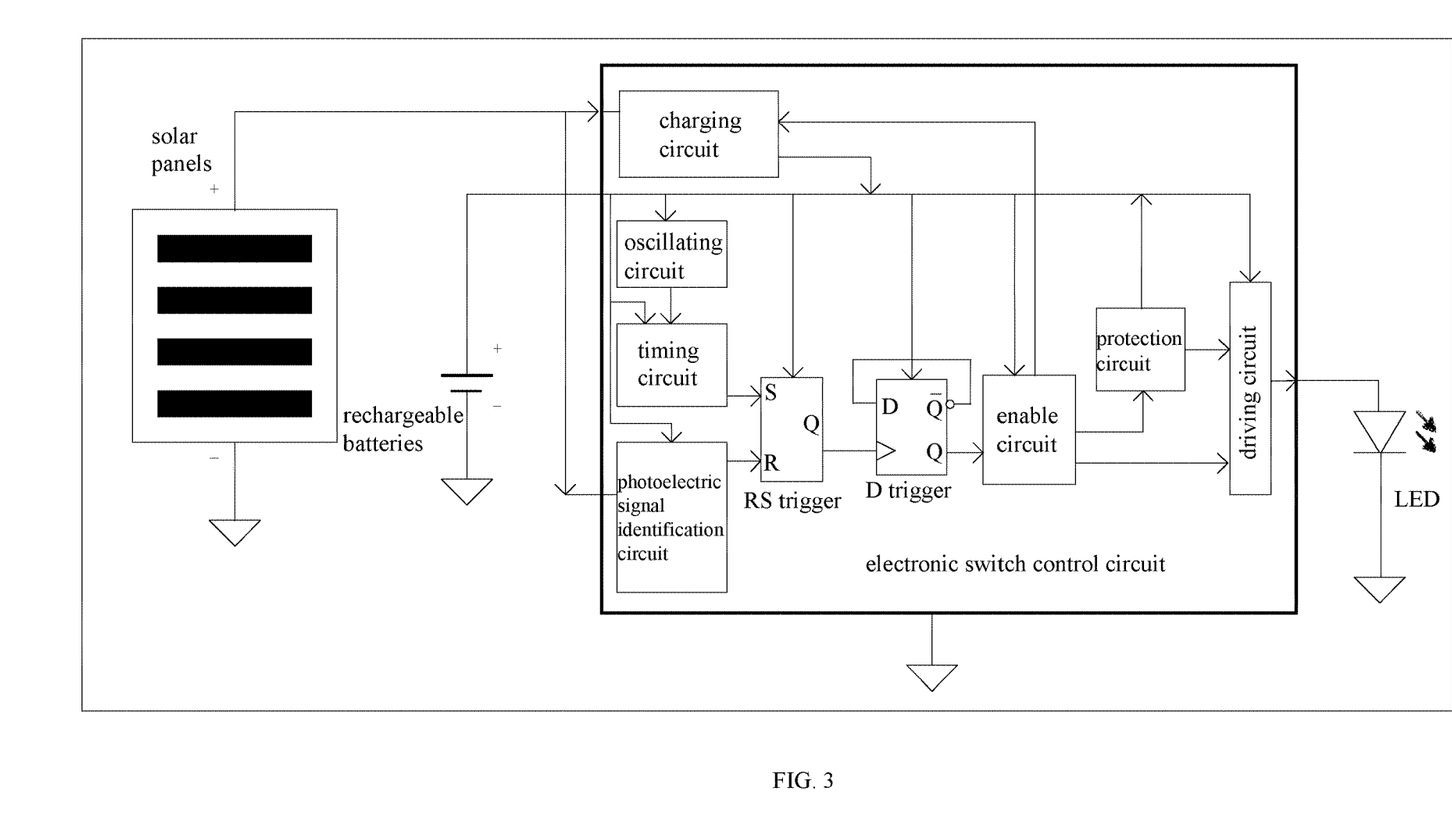
FIG. 3 is a circuit block diagram of the electronic switch control circuit for the solar lighting system according to the third embodiment as provided herein.
Figure 8:
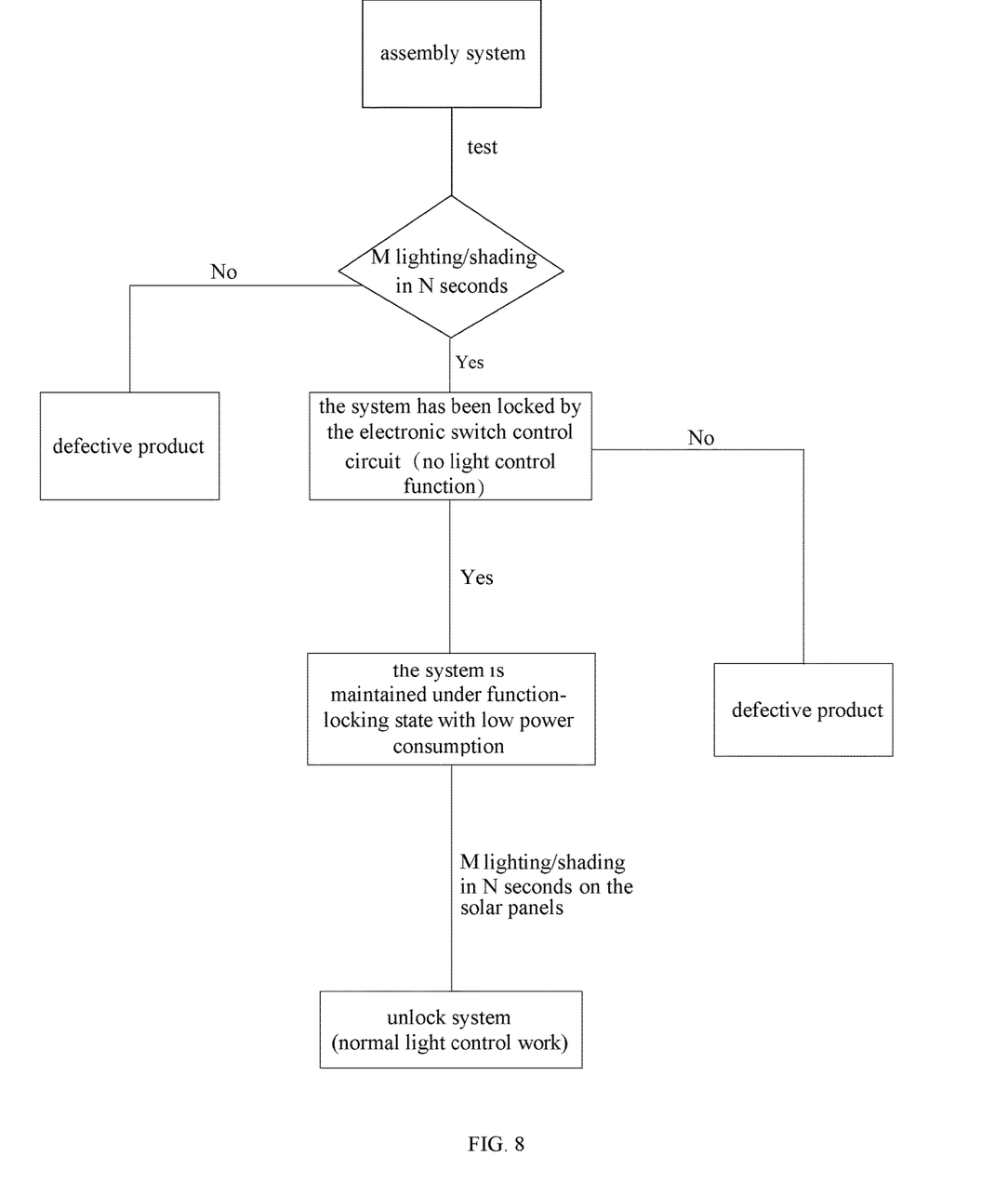
FIG. 8 is a flow chart of the method for controlling the electronic switch control circuit according to the second embodiment as described herein.

FIGS. 3 and 8 illustrate the second embodiment as provided herein.

As shown in FIG. 3, the solar panels of the solar lighting system are respectively coupled to a charging circuit and a photoelectric signal identification circuit which is coupled to a RS trigger, a D trigger, an enable circuit and a driving circuit sequentially. The enable circuit is respectively coupled to a protection circuit coupled to the driving circuit and the charging circuit coupled to the common end of the driving circuit and the rechargeable batteries. The common end of the driving circuit and the rechargeable batteries is also coupled to an oscillating circuit, a timing circuit, photoelectric signal identification circuit, the RS trigger, the D trigger, the enable circuit, the protection circuit and the driving circuit. The oscillating circuit is coupled to the timing circuit that is coupled to the RS trigger. $\overline{Q}$ pin of the D trigger is coupled to D pin of the D trigger. The driving circuit is coupled to the LED lamp. The oscillating circuit generates a clock signal. The timing circuit receives the clock signal and then performs timekeeping for controlling the preset time (N seconds). The photoelectric signal identification circuit is configured to detect the number (M) of the lighting/shading actions on the solar panels.

In the day time, the driving circuit for the LED receives a control signal from the photoelectric signal identification circuit to cut off the current flowing to the LED, so that the LED does not emit light. When the voltage of the solar panels is higher than that of the rechargeable batteries, the solar panels charge the rechargeable batteries through the charging circuit. At night, the driving circuit receives a control signal from the photoelectric signal identification circuit to supply the current from the rechargeable batteries to the LED to allow the LED to emit light. At this time, since the voltage of the solar panels is lower than that of the rechargeable batteries, the rechargeable batteries will not be charged, and the charging circuit will prevent the current of the rechargeable batteries from flowing to the solar panels. The oscillating circuit generates a clock signal. The timing circuit receives the clock signal and then performs timekeeping for controlling the preset time (N seconds). The photoelectric signal identification circuit is configured to detect the number (M) of the lighting/shading action on the solar panels.

As shown in FIG. 8, the method for controlling the electronic switch control circuit for the solar LED lighting system comprises the following steps:

(1) initiating test for the solar LED lighting system after completing assembly of the system;

(2) performing a preset number of lighting/shading actions (M) on solar panels within a preset time (N seconds), and observing the state of the LED in the solar LED lighting system;

(3) determining, whether the state of the LED is consistent with an expected state corresponding to the lighting/shading actions and the LED is maintained in an off state after M numbers of lighting/shading actions on the solar panels, if yes, it can be determined that the solar LED lighting system has been locked by the electronic switch control circuit, if not (for example the LED is not maintained in an off state after M numbers of lighting/shading actions on the solar panels), it can be determined that the solar LED lighting system is a defective system;

(4) maintaining the system under function-locking state with low power consumption after locking the system, and then packing the product having the solar LED lighting system as provided herein;

(5) unlocking the system through performing M numbers of lighting/shading actions on the solar panels within N seconds when using the product.

Figure 4:
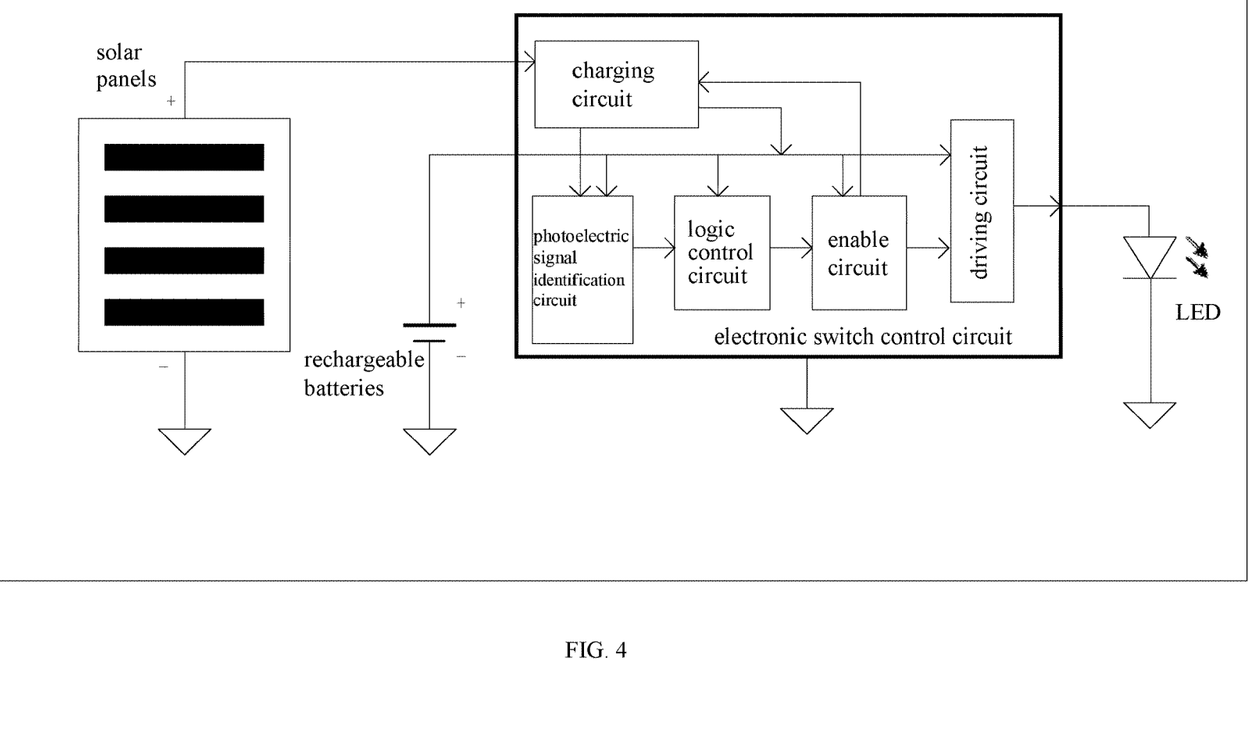
FIG. 4 is a circuit block diagram of the electronic switch control circuit for the solar lighting system according to the fourth embodiment as provided herein.

FIG. 4 illustrates the third embodiment as provided herein.

As shown in FIG. 4, the solar light system as provided herein comprises solar panels which are coupled to a charging circuit. Rechargeable batteries are coupled to a driving circuit, and the charging circuit is respectively coupled to a photoelectric signal identification circuit, an enable circuit, the common end of the rechargeable batteries and a driving circuit. The common end of the rechargeable batteries and the driving circuit is respectively coupled to the photoelectric signal identification circuit, the logic control circuit and the enable circuit. The photoelectric signal identification circuit is coupled to the logic control circuit, the enable circuit, the driving circuit, and the LED lamp sequentially.

Figure 5:
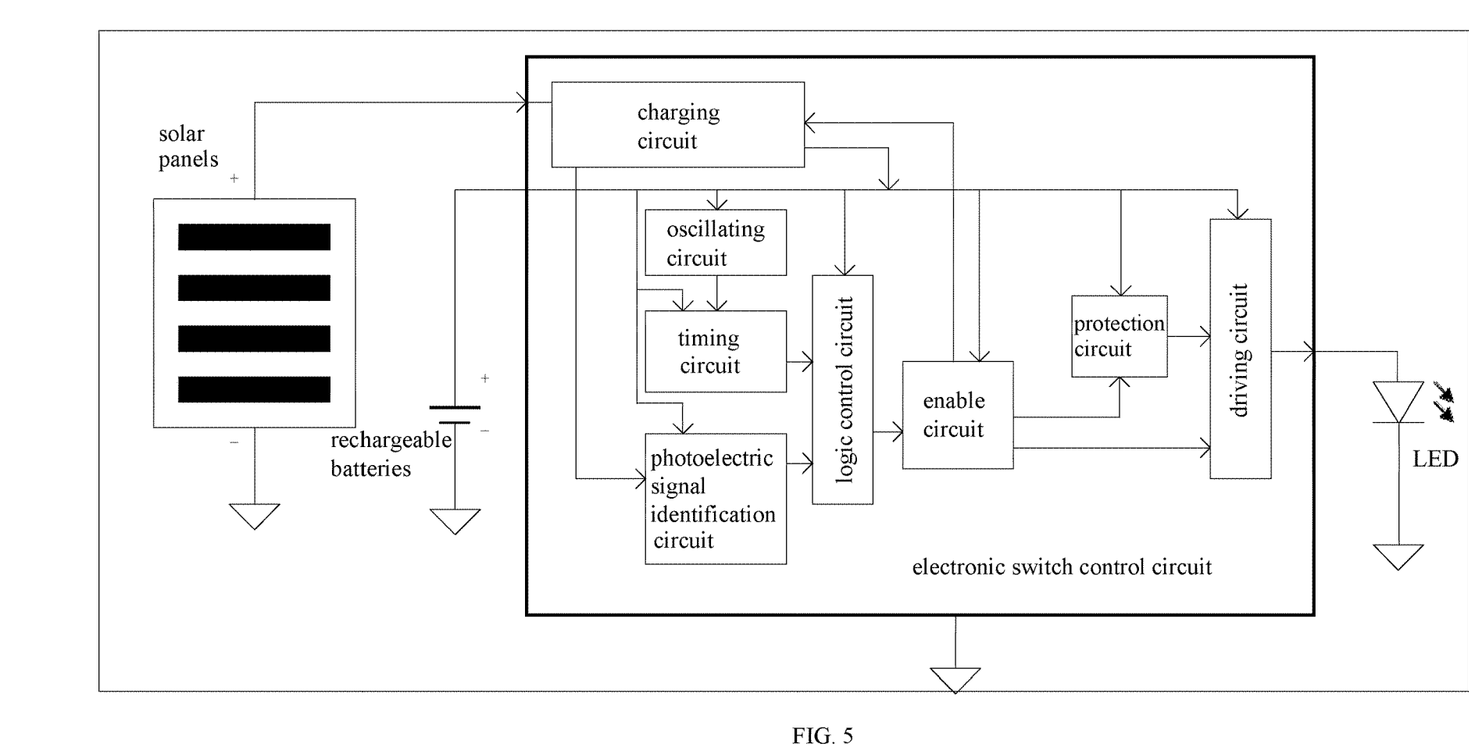
FIG. 5 is a circuit block diagram of the electronic switch control circuit for a solar lighting system according to the fifth embodiment as provided herein.

FIGS. 5 and 7 illustrate the fourth embodiment as provided herein.

As shown in FIG. 5, a solar lighting LED system includes solar panels and an electronic switch control circuit. The electronic switch control circuit includes a charging circuit, rechargeable batteries, an oscillating circuit, a timing circuit, a photoelectric signal identification circuit, a logic control circuit, a protection circuit, an enable circuit, a driving circuit and a LED lamp. The solar panels are coupled to the charging circuit that is respectively coupled to the photoelectric signal identification circuit, the enable circuit and the common end of the rechargeable batteries and the driving circuit. The rechargeable batteries are coupled to the driving circuit, and the common end of the rechargeable batteries and the driving circuit is respectively coupled to the oscillating circuit, the timing circuit, the photoelectric signal discrimination circuit, the logic control circuit, the enable circuit and the protection circuit. The oscillating circuit is coupled to the timing circuit. The timing circuit and the photoelectric signal identification circuit are coupled to the logic control circuit that is coupled to the enable circuit. The enable circuit is respectively coupled to the protection circuit and the driving circuit that is coupled to the LED lamp. The oscillating circuit generates a clock signal. The timing circuit receives the clock signal and then performs timekeeping for controlling the preset time (N seconds). The photoelectric signal identification circuit is configured to detect the number (M) of lighting/shading actions on the solar panels.

As shown in FIG. 7, the method for controlling the electronic switch control circuit for the solar LED lighting system includes the following steps:

(1) initiating test for the solar LED lighting system after completing assembly of the system;

(2) performing a preset number of lighting/shading actions (M) on solar panels within a preset time (N seconds), and observing the state of the LED in the solar LED lighting system;

(3) determining, whether the state of the LED is consistent with an expected state corresponding to the lighting/shading actions and the LED is off after the lighting/shading actions for Y seconds, if yes, it can be determined that the solar LED lighting system has been locked by the electronic switch control circuit, and no light control response function is exhibited, so as to save time for packing the product comprising the solar LED lighting system as provided herein; if not (for example the LED is not off after the lighting/shading actions), the solar LED lighting system may be considered as a defective system;

(4) maintaining the system under function-locking state with low power consumption after locking the system, and then packing the product having the solar LED lighting system as provided herein;

(5) unlocking the system through performing one lighting/shading action on the solar panels.

Figure 6:
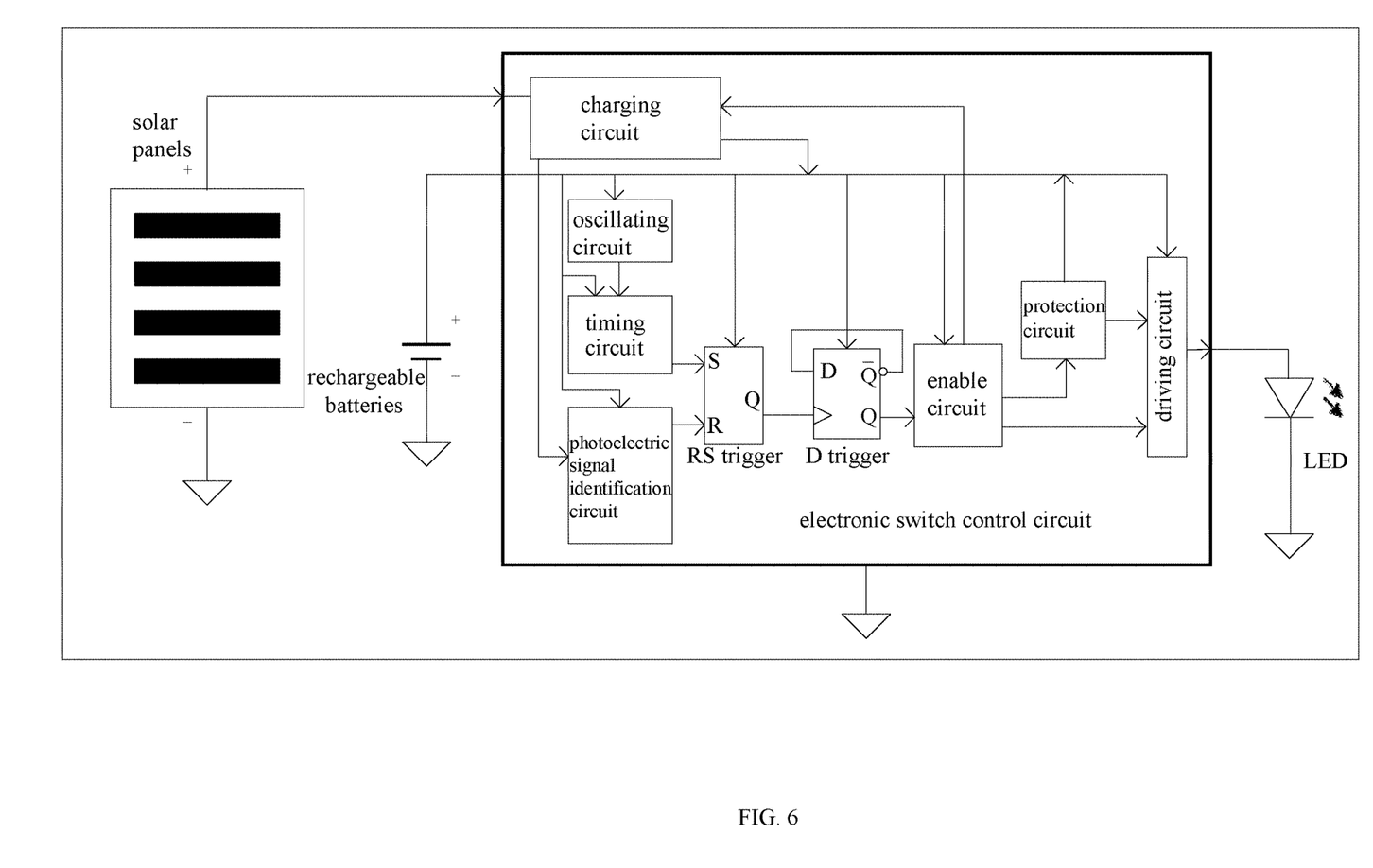
FIG. 6 is a circuit block diagram of the electronic switch control circuit for a solar lighting system according to the sixth embodiment as provided herein.

FIGS. 6 and 8 illustrate the fifth embodiment as provided herein.

As shown in FIG. 6, a solar LED lighting system includes solar panels and an electronic switch control circuit. The electronic switch control circuit includes a charging circuit, rechargeable batteries, an oscillating circuit, a timing circuit, a photoelectric signal identification circuit, an RS trigger, a D trigger, a protection circuit, an enable circuit, a driving circuit and a LED lamp. The solar panels are coupled to the charging circuit which is respectively coupled to the photoelectric signal identification circuit and the common end of the rechargeable batteries and the driving circuit. The rechargeable batteries are coupled to the driving circuit, and the common end of the rechargeable batteries and the driving circuit is respectively coupled to the oscillating circuit, the timing circuit, the photoelectric signal identification circuit, the RS trigger, the D trigger, the enable circuit and the protection circuit. The timing circuit and the photoelectric signal identification circuit are respectively coupled to the RS trigger that is coupled to the D trigger. $\bar{Q}$ pin of the D trigger is coupled to D pin of the D trigger, and Q pin of the D trigger is coupled to the enable circuit. The enable circuit is respectively coupled to the driving circuit, the protection circuit and the charging circuit. The protection circuit is coupled to the driving circuit that is coupled to the LED lamp. The oscillating circuit generates a clock signal. The timing circuit receives the clock signal and then performs timekeeping for controlling the preset time (N seconds). The photoelectric signal identification circuit is configured to detect the number of the lighting/shading action (M).

As shown in FIG. 8, the method for controlling the electronic switch control circuit for the solar LED lighting system comprises the following steps:

(1) initiating test for the solar LED lighting system after completing assembly of the system;

(2) performing a preset number of lighting/shading actions (M) on solar panels within a preset time (N seconds), and observing the state of the LED in the solar LED lighting system;

(3) determining, whether the state of the LED is consistent with an expected state corresponding to the lighting/shading actions and the LED is maintained in an off state after M numbers of lighting/shading actions on the solar panels, if yes, it can be determined that the solar LED lighting system has been locked by the electronic switch control circuit, if not (for example the LED is not maintained in an off state after M numbers of lighting/shading actions on the solar panels), it can be determined that the solar LED lighting system is a defective system;

(4) maintaining the system under function-locking state with low power consumption after locking the system, and then packing the product having the solar LED lighting system as provided herein;

(5) unlocking the system through performing M numbers of lighting/shading actions on the solar panels within N seconds when using the product.

Figure 1:
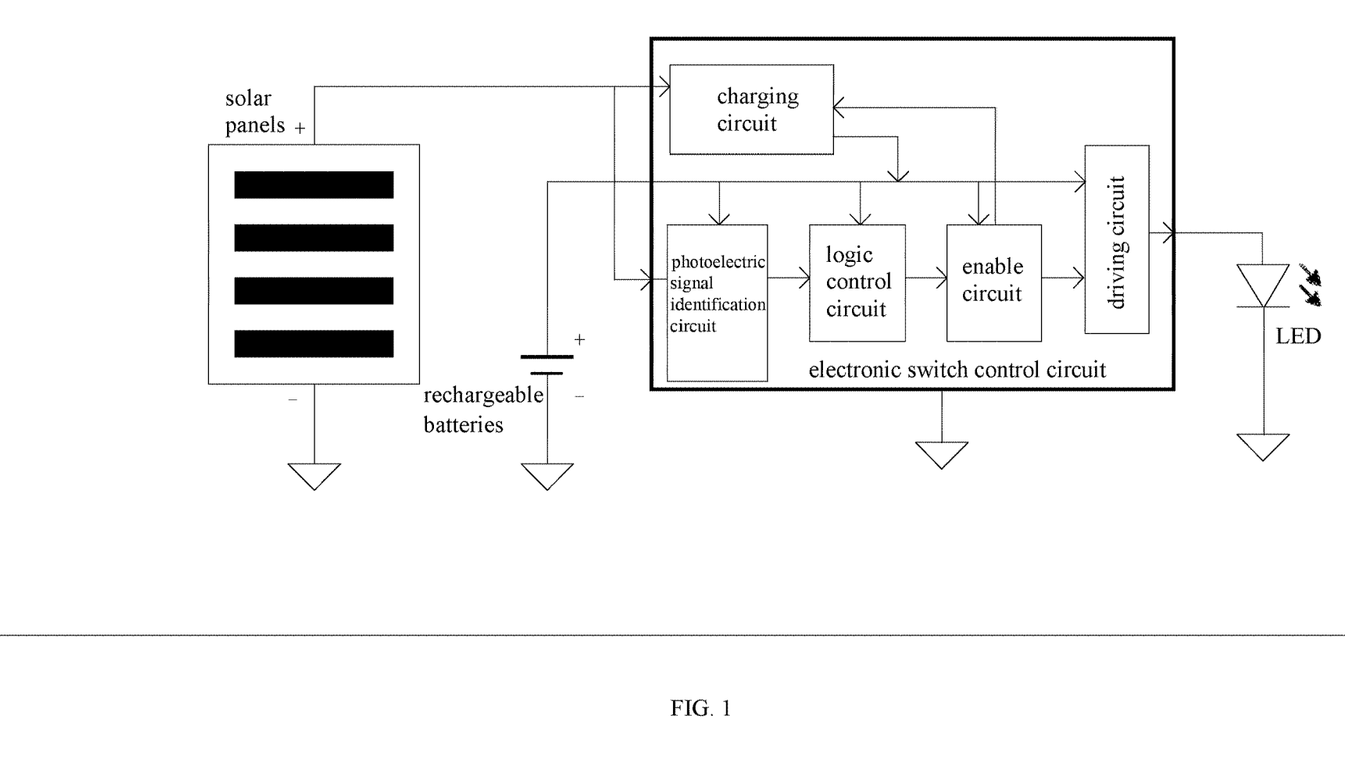
FIG. 1 is a circuit block diagram of the electronic switch control circuit for the solar lighting system according to the first embodiment as provided herein.

FIG. 1 illustrates the sixth embodiment as provided herein.

As shown in FIG. 1, the solar lighting system includes solar panels and an electronic switch control circuit. The solar panels are respectively coupled to a charging circuit and a photoelectric signal identification circuit. The charging circuit is coupled to the common end of the rechargeable batteries and a driving circuit. The rechargeable batteries are coupled to the driving circuit, and the common end of the rechargeable batteries and the driving circuit is also respectively coupled to the photoelectric signal identification circuit, the logic control circuit, and the enable circuit. The photoelectric signal identification circuit is coupled to the logic control circuit which is coupled to the enable circuit.

Further, the enable circuit is respectively coupled to the charging circuit and the driving circuit. The driving circuit is coupled to LED lamp or the cathode of the LED lamp and the anode of the LED lamp is coupled to a power supply.

The above are only the illustrative embodiments of the present invention. One having the ordinary skill in the art would understand that many modifications, changes or substitutions may be made without departing from the spirit of the present invention. Thus, the equivalent variations according to the present invention come within the scope of the present invention.

The invention claimed is:

1. A method for controlling an electronic switch control circuit for a solar lighting system, characterized in that the method comprises the following steps:
   (1) initiating test for the solar lighting system after completing assembly of the system;
   (2) performing a preset number of lighting/shading actions (M) on solar panels within a preset time (N seconds), and observing the state of the solar lighting system;
   (3) determining, whether the state of the solar lighting system is consistent with an expected state corresponding to the lighting/shading actions and the solar lighting system is maintained in an off state after M numbers of lighting/shading actions on the solar panels, if yes, it can be determined that the solar lighting system has been locked by the electronic switch control circuit, if not, it can be determined that the solar lighting system is a defective system;
   (4) maintaining the system under function-locking state with low power consumption after locking the system, and then packing the product having the solar lighting system as provided herein;
   (5) unlocking the system through performing M numbers of lighting/shading actions on the solar panels within N seconds when using the product.

2. A method for controlling an electronic switch control circuit for a solar lighting system, characterized in that the method comprises the following steps:
   (1) initiating test for the solar lighting system after completing assembly of the system;
   (2) performing a preset number of lighting/shading actions (M) on solar panels within a preset time (N seconds), and observing the state of the solar lighting system;
   (3) determining, whether the state of the solar lighting system is consistent with an expected state corresponding to the lighting/shading actions and the solar lighting system is maintained in an off state after M numbers of lighting/shading actions on the solar panels, if yes, it can be determined that the solar lighting system is locked by the electronic switch control circuit, if not, it can be determined that the solar lighting system is a defective system; or
   determining, whether the state of the solar lighting system is consistent with an expected state corresponding to the lighting/shading actions and LED is off after the lighting/shading actions for Y seconds, if yes, it can be determined that the solar lighting system is locked by the electronic switch control circuit, and no light control response function is exhibited, so as to save time for packing the product comprising the solar lighting system as provided herein; if not, the solar lighting system may be considered as a defective system;
   (4) unlocking the system through performing one lighting/shading action on the solar panels when using the product.

* * * * *